US010820268B2

(12) United States Patent
Park et al.

(10) Patent No.: US 10,820,268 B2
(45) Date of Patent: Oct. 27, 2020

(54) BEACON DEVICE INCLUDING SWITCH AND SERVICE PROVIDING METHOD USING THE SAME

(71) Applicant: BENPLE INC., Seoul (KR)

(72) Inventors: Dong Jin Park, Incheon (KR); Jung Ho Jun, Seoul (KR)

(73) Assignee: BENPLE INC., Seoul (KR)

( * ) Notice: Subject to any disclaimer, the term of this patent is extended or adjusted under 35 U.S.C. 154(b) by 23 days.

(21) Appl. No.: 16/310,082

(22) PCT Filed: Jun. 9, 2017

(86) PCT No.: PCT/KR2017/006042
§ 371 (c)(1),
(2) Date: Dec. 14, 2018

(87) PCT Pub. No.: WO2017/217704
PCT Pub. Date: Dec. 21, 2017

(65) Prior Publication Data
US 2019/0253969 A1  Aug. 15, 2019

(30) Foreign Application Priority Data

Jun. 15, 2016  (KR) ........................ 10-2016-0074738

(51) Int. Cl.
*H04W 52/02* (2009.01)
*H04W 76/28* (2018.01)
(Continued)

(52) U.S. Cl.
CPC ......... *H04W 52/0216* (2013.01); *H04W 4/80* (2018.02); *H04W 40/244* (2013.01);
(Continued)

(58) Field of Classification Search
CPC ... H04W 52/0216; H04W 52/02; H04W 4/00; H04W 76/28; H04W 4/80; H04W 76/11;
(Continued)

(56) References Cited

U.S. PATENT DOCUMENTS

| 5,428,820 | A | * | 6/1995 | Okada | .................. H04B 1/1615 340/7.33 |
| 2002/0097032 | A1 | * | 7/2002 | Inaba | ........................ G06F 1/26 323/283 |

(Continued)

FOREIGN PATENT DOCUMENTS

| JP | 2014-138339 | 7/2014 |
| KR | 10-2013-0063913 | 6/2013 |

(Continued)

OTHER PUBLICATIONS

Lee Nam Suk et al., "Method and device for idle mode entry in broadband wireless communication service", KR, KR2013-0063913, English machine language translation. (Year: 2013).*

(Continued)

*Primary Examiner* — Ricky Q Ngo
*Assistant Examiner* — Michael K Phillips (57) ABSTRACT

A Bluetooth low energy (BLE)-based beacon device includes a wireless transmitter, a memory device that stores an ID of the BLE-based beacon device, a switch, and a control circuit that senses the switch being pressed, changes a state of the BLE-based beacon device from an idle state to a wakeup state based on a result of the sensing, determines whether a predetermined period of time has elapsed, and changes the state of the BLE-based beacon device from the wakeup state to the idle state when the predetermined period of time has elapsed. The control circuit transmits the ID stored in the memory device to the wireless transmitter only while the BLE-based beacon device is in the wakeup state.

6 Claims, 7 Drawing Sheets

(51) Int. Cl.
  *H04W 4/80* (2018.01)
  *H04W 76/11* (2018.01)
  *H04W 40/24* (2009.01)
(52) U.S. Cl.
  CPC ....... *H04W 52/02* (2013.01); *H04W 52/0229* (2013.01); *H04W 76/11* (2018.02); *H04W 76/28* (2018.02); *Y02D 70/10* (2018.01); *Y02D 70/14* (2018.01); *Y02D 70/20* (2018.01)
(58) Field of Classification Search
  CPC ............ H04W 40/244; H04W 52/0229; Y02D 70/10; Y02D 70/14; Y02D 70/20; G06F 1/3206; G06F 1/3203
  See application file for complete search history.

(56) References Cited

U.S. PATENT DOCUMENTS

| | | | | |
|---|---|---|---|---|
| 2013/0212219 A1* | 8/2013 | Koskela | ................ | H04W 76/28 709/217 |
| 2013/0214909 A1* | 8/2013 | Meijers | ................ | H04W 4/029 340/10.5 |
| 2015/0323984 A1* | 11/2015 | Ganton | ................ | G06F 1/28 713/323 |
| 2016/0027079 A1* | 1/2016 | Schoeffler | .......... | H04N 5/23293 705/325 |
| 2016/0132091 A1* | 5/2016 | Bodner | .................... | G06F 1/06 713/323 |
| 2016/0174022 A1* | 6/2016 | Nhu | ........................ | H04W 4/70 455/41.2 |

FOREIGN PATENT DOCUMENTS

| | | |
|---|---|---|
| KR | 10-2015-0049842 | 5/2015 |
| KR | 10-2015-0084263 | 7/2015 |
| KR | 10-2015-0135632 | 12/2015 |

OTHER PUBLICATIONS

Park Youn Ho, "Electronic device, power controlling method of tethering mode and system", KR, KR2015-0049842, English machine language translation. (Year: 2015).*

Kang Soon Ju, et al., "System and method for providing inter-device service", KR, KR2015-0084263, English machine language translation. (Year: 2015).*

Park Sang Keun, et al., "A store management system using indoor positioning base service of bluetooth low energy beacon base and method thereof", KR, KR2015-0135632, English machine language translation. (Year: 2015).*

* cited by examiner

BEACON DEVICE INCLUDING SWITCH AND SERVICE PROVIDING METHOD USING THE SAME

CROSS-REFERENCE TO RELATED APPLICATION

This application is a U.S. national phase application of PCT International Application PCT/KR2017/006042, filed Jun. 9, 2017, which claims priority to Korean Patent Application No. 10-2016-0074738, filed Jun. 15, 2016, the contents of which are incorporated herein by reference in their entirety.

TECHNICAL FIELD

Embodiments of the present inventive concepts relate to a beacon device, and more particularly to a beacon device capable of outputting a beacon signal only for a predetermined period of time on the basis of a user's behavior to save energy, and a method of providing a service using the beacon device.

BACKGROUND ART

In general, when a consumer installs an application in a smart device (for example, a smart phone, a tablet PC, or a wearable device), a beacon refers to a local area communication technology using Bluetooth low energy (BLE) that enables a message transmission, a mobile payment, or the like by finding a location of the smart device existing within a radius of 50 m to 70 m.

Since a data communication protocol used in a beacon signal transmitter of a beacon complies with the standard of BLE, a smart device supporting BLE 4.0 may receive a beacon signal from the beacon.

However, since an arrival distance of the beacon signal output from the beacon is approximately 50 m, a message or a coupon is automatically transmitted to all smart devices existing in a signal region of the beacon signal transmitter of the beacon, and thus the message, the coupon, or the like may be transmitted to a smart device of a user who does not need to receive the message, the coupon, or the like.

In addition, since a beacon using a battery transmits a beacon signal all the time, power consumption of the beacon increases, and thereby a lifespan of the battery is shortened.

Technical Problem

A technical aspect of the present inventive concepts is to provide a beacon device which includes a switch capable of triggering transmission of a beacon signal, transmits the beacon signal only during a predetermined period of time in which the beacon device operates in a wakeup state if a user desiring to receive the beacon signal presses the switch, and automatically enters an idle state (or a low power state) from the wakeup state to reduce power consumption if the predetermined period of time automatically calculated elapses, and a method of providing a service using the beacon device.

Technical Solution

An exemplary embodiment of the present inventive concepts is directed to a Bluetooth low energy (BLE)-based beacon device, including a wireless transmitter, a memory device that stores an ID of the BLE-based beacon device, a switch, and a control circuit that changes a state of the BLE-based beacon device from an idle state to a wakeup state based on a wakeup signal generated in response to the switch being pressed, and transmits the ID stored in the memory device to the wireless transmitter only while the state of the BLE-based beacon device is the wakeup state.

The control circuit may generate a count value by counting an operation time based on the wakeup signal, maintain the state of the BLE-based beacon device as the wakeup state until the count value reaches a reference count value, and change the state of the BLE-based beacon device from the wakeup state to the idle state when the count value is greater than the reference count value.

Another exemplary embodiment of the present inventive concepts is directed to a Bluetooth low energy (BLE)-based beacon device, including a wireless transmitter, a memory device that stores an ID of the BLE-based beacon device, a switch, and a control circuit that senses the switch being pressed, changes a state of the BLE-based beacon device from an idle state to a wakeup state based on a result of the sensing, determines whether a predetermined period of time has elapsed, and changes the state of the BLE-based beacon device from the wakeup state to the idle state if the predetermined period of time has elapsed, in which the control circuit transmits the ID stored in the memory device to the wireless transmitter only while the BLE-based beacon device is in the wakeup state.

Still another exemplary embodiment of the present inventive concepts is directed to a method of providing a beacon service using a BLE-based beacon device, including changing, if a user of a mobile device presses a switch of a BLE-based beacon device in an idle state, by the BLE-based beacon device, a state of the BLE-based beacon device from the idle state to a wakeup state based on a wakeup signal generated in response to the switch being pressed, and transmitting, by the BLE-based beacon device, an ID of the BLE-based beacon device to the mobile device only while the state of the BLE-based beacon device is the wakeup state.

The method of providing a beacon service using a BLE-based beacon device may further include generating a count value by counting an operation time based on the wakeup signal, maintaining the state of the BLE-based beacon device as the wakeup state until the count value reaches a reference count value, and changing the state of the BLE-based beacon device from the wakeup state to the idle state when the count value is greater than the reference count value.

Still another exemplary embodiment of the present inventive concepts is directed to a method of providing a beacon service using a BLE-based beacon device, including sensing, if a user of a mobile device presses a switch of the BLE-based beacon device in an idle state, by the BLE-based beacon device, the switch being pressed to change a state of the BLE-based beacon device from the idle state to a wakeup state based on a result of the sensing, transmitting, by the BLE-based beacon device, an ID of the BLE-based beacon device to the mobile device only while the BLE-based beacon device is in the wakeup state, determining, by the BLE-based beacon device, whether a predetermine period of time has elapsed, and changing, by the BLE-based beacon device, the state of the BLE-based beacon device from the wakeup state to the idle state if the predetermined period of time has elapsed.

The method of providing a beacon service using a BLE-based beacon device may further include blocking, by the BLE-based beacon device, power supplied to a wireless transmitter transmitting the ID of the BLE-based beacon device to the mobile device if the state of the BLE-based beacon device is changed from the wakeup state to the idle state.

Advantageous Effects

According to one exemplary embodiment of the present inventive concepts, a beacon device including a switch capable of triggering transmission of a beacon signal may change an operation state of the beacon device from an idle state to a wakeup state if a user of a mobile device which may receive the beacon signal presses the switch, transmit the beacon signal only during a predetermined period of time in which the beacon device operates in the wakeup state, and automatically return to the idle state from the wakeup state to reduce power consumption of the beacon device if the predetermined period of time automatically calculated elapses.

The user may receive a beacon signal only when he or she desires and may use a battery of the beacon device for a long time by reducing power consumption of the beacon device because the beacon device is capable of transmitting the beacon signal only during a predetermined period of time after the switch is pressed.

BEST MODE

In the present specification, a beacon device 100A or 100B (collectively, "100") includes a switch 110 capable of triggering transmission of a beacon signal (for example, a beacon identification (BID)) and/or an NFC tag 115, and includes a control circuit 120A or 120B capable of changing an operation state of the beacon device 100A, 100B, or 100 from an idle state (or a low power state) to a wakeup state (or a normal operation state) based on a wakeup signal WKU1 or WKU2, and automatically changing the operation state of the beacon device 100A, 100B, or 100 from the wakeup state to the idle state to reduce power consumption when a predetermined period of time is counted from a time at which the beacon device 100A, 100B, or 100 is waken up and the predetermined period of time elapses.

Figure 1:
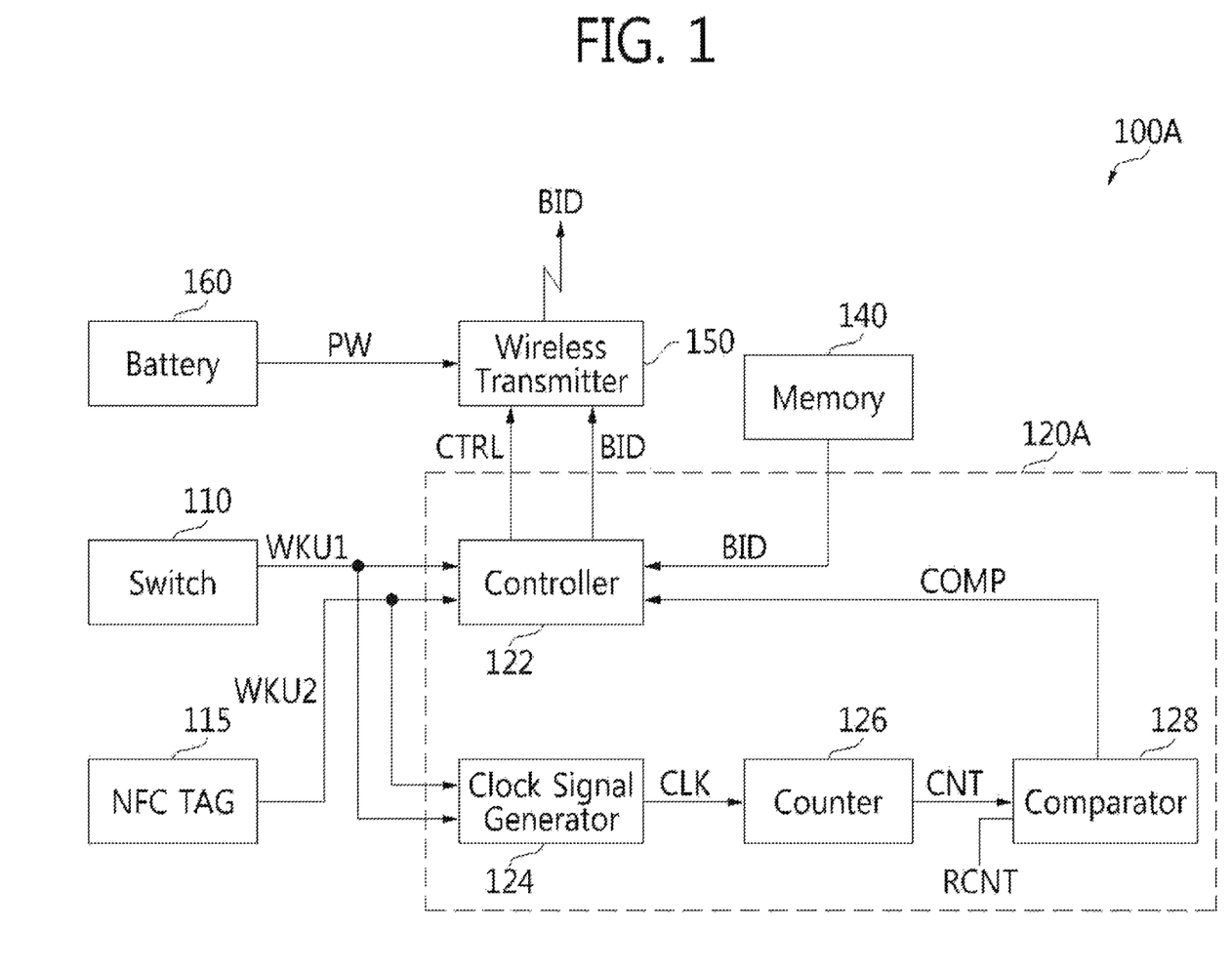
FIG. 1 is a block diagram of a beacon device according to exemplary embodiments of the present invention.

FIG. 1 is a block diagram of a beacon device according to exemplary embodiments of the present invention. Referring to FIG. 1, a beacon device 100A, for example, a Bluetooth low energy (BLE)-based beacon device 100A, may include a switch 110, an NFC tag 115, a control circuit 120A, a memory device 140, a wireless transmitter 150, and a battery 160. Although the beacon device 100A including both the switch 110 and the NFC tag 115 is shown by way of example in FIG. 1, the beacon device 100A may include the switch 110 or the NFC tag 115 according to exemplary embodiments.

As the switch 110 is pressed (or touched) by a user, the switch 110 may generate a first wakeup signal WKU1. The switch 110 may be implemented as a button, for example, a push button switch; however, the present embodiment is not limited thereto.

For example, the beacon device 100A, 100B, or 100 operates in one of a wakeup state and an idle state (a first operation mode) when the switch 110 is pressed for a first period of time, the beacon device 100A, 100B, or 100 maintains a wakeup state all the time (a second operation mode) when the switch 110 is pressed for a second period of time, and the beacon device 100A, 100B, or 100 is reset or initialized (a third operation mode) when the switch 110 is pressed for a third period of time. The third period of time is longer than the second period of time, and the second period of time is longer than the first period of time. Accordingly, the control circuit 120A or 120B may control an operation mode of the beacon device 100A according to a period of time for which the switch 110 is pressed.

The beacon device 100A, 100B, or 100 may broadcast or transmit an ID (BID) of the beacon device 100A, 100B, or 100 for a predetermined period of time after the switch 110 is pressed in the first operation mode, and may broadcast or transmit the ID (BID) of the beacon device 100A, 100B, or 100 all the time regardless of whether the switch 110 is pressed in the second operation mode. A default mode of the beacon device 100A, 100B, or 100 may be set as the first operation mode.

The NFC tag 115 may generate a second wakeup signal WKU2 based on an NFC signal output from an NFC reader implemented in a mobile device of a user. The mobile device may be a smart phone, a tablet PC, a wearable computer, an Internet of Things (IoT) device, or an Internet of Everything (IoE) device; however, the present embodiment is not limited thereto.

The control circuit 120A may change the state of the beacon device 100A from an idle state to a wakeup state based on a first wakeup signal WKU1 generated in response to the switch 110 being pressed (or touched) or a second wakeup signal WKU2 generated by the NFC tag 115, and transmit the ID (BID) of the beacon device 100A stored in the memory device 140 to the wireless transmitter 150 periodically or several times only while the state of the beacon device 100A is the wakeup state.

The control circuit 120A may generate a count value CNT by counting an operation time corresponding to a wakeup state based on a first wakeup signal WKU1 or a second wakeup signal WKU2, maintain the state of the beacon device 100A as the wakeup state until the count value CNT reaches a reference count value RCNT, and change the state of the beacon device 100A from the wakeup state to the idle state when the count value CNT is greater than the reference count value RCNT. The state may refer to an operation mode.

The control circuit 120A includes a clock signal generator 124, a counter 126, a comparator 128, and a controller 122.

According to exemplary embodiments, the clock signal generator 124, the counter 126, and the comparator 128 may be replaced with a single timer. The timer may count a period of time during which a wakeup state is maintained based on a first wakeup signal WKU1 or a second wakeup signal WKU2 and output a control signal for changing a state of the beacon device 100A from a wakeup state to an idle state to the controller 122 after the operation time elapses. According to exemplary embodiments, the timer may be implemented as a hardware timer or a firmware (or software) timer. For example, the controller 122 may execute the firmware (or software) timer.

The clock signal generator 124 generates a clock signal CLK based on or in response to a first wakeup signal WKU1 or a second wakeup signal WKU2. The counter 126 generates a count value CNT in response to (or based on) the clock signal CLK. The comparator 128 compares the count value CNT with a reference count value RCNT, and generates a comparison signal COMP.

A state of the controller 122 is changed from an idle state to a wakeup state based on a first wakeup signal WKU1 or a second wakeup signal WKU2. The controller 122 may refer to a central processing unit (CPU) or a microprocessor. According to exemplary embodiments, the control circuit 120A may refer to the CPU or the microprocessor. The wakeup state refers to a state in which the ID (BID) may be broadcast or transmitted, and the idle state refers to a state in which the ID (BID) cannot be broadcast or transmitted.

The controller 122 may maintain the state of the beacon device 100A as the wakeup state based on a comparison signal COMP having a first level (for example, a low level) which is generated when the count value CNT is equal to or less than the reference count value RCNT. However, the controller 122 may change the state of the beacon device 100A from the wakeup state to the idle state based on a comparison signal COMP having a second level (for example, a high level) which is generated when the count value CNT is greater than the reference count value RCNT.

The control circuit 120A may generate a control signal CTRL for controlling at least one of the wireless transmitter 150 and the battery 160 such that an output voltage PW of the battery 160 is supplied to the wireless transmitter 150 only while the state of the beacon device 100A maintains the wakeup state.

For example, the controller 122 may generate a control signal CTRL having a first level based on a first wakeup signal WKU1 or a second wakeup signal WKU2. At least one of the wireless transmitter 150 and the battery 160 may supply the output voltage PW of the battery 160 to the wireless transmitter 150 in response to the control signal CTRL having a first level.

When the comparison signal COMP having a first level (for example, a low level) is input while the output voltage PW of the battery 160 is supplied to the wireless transmitter 150, the controller 122 may generate (or maintain) a control signal CTRL having a first level.

However, when the comparison signal COMP having a second level (for example, a high level) is input while the output voltage PW of the battery 160 is supplied to the wireless transmitter 150, the controller 122 may generate a control signal CTRL having a second level. At least one of the wireless transmitter 150 and the battery 160 may block the output voltage PW of the battery 160 from being supplied to the wireless transmitter 150 in response to the control signal CTRL having a second level. Therefore, the wireless transmitter 150 may be enabled in response to the control signal CTRL having a first level and may be disabled in response to the control signal CTRL having a second level. As a result, power consumed in a disabled wireless transmitter 150 may be blocked.

According to exemplary embodiments, when the comparison signal COMP having a second level (for example, a high level) is input while the output voltage PW of the battery 160 is supplied to the wireless transmitter 150, the controller 122 may perform an operation of blocking an operation voltage (or power) from being supplied to at least one of the clock signal generator 124, the counter 126, the comparator 128, and the memory device 140.

When the state of the beacon device 100A is an idle state, operation voltages supplied to the parts 124, 126, 128, 140, and 150 except for a part for monitoring a reception of a first wakeup signal WKU1 or a second wakeup signal WKU2 may be blocked by the switch 110 or the controller 122. As a result, power consumption of the beacon device 100A may be reduced.

Figure 2:
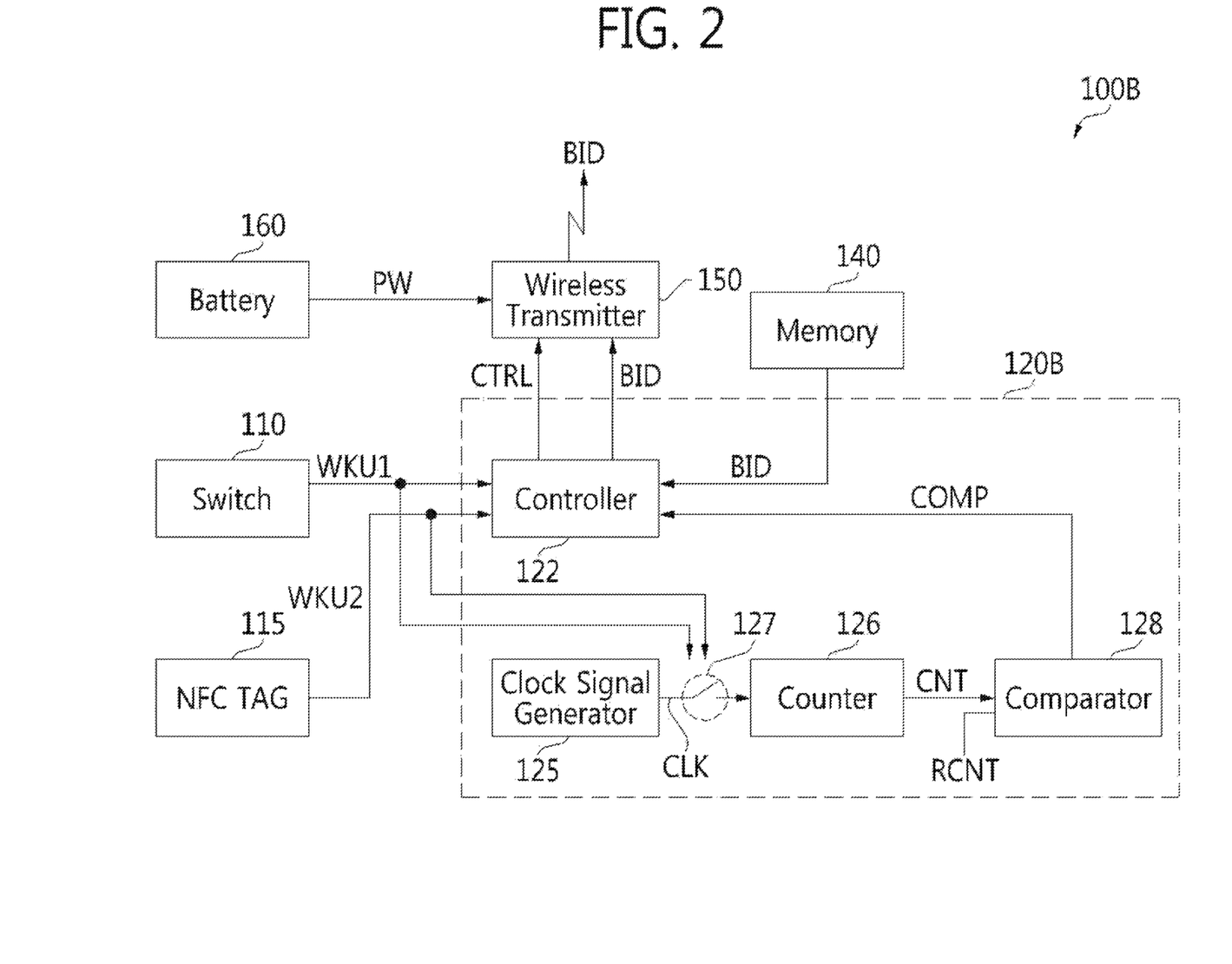
FIG. 2 is a block diagram of the beacon device according to exemplary embodiments of the present invention.

FIG. 2 is a block diagram of a beacon device according to exemplary embodiments of the present invention. Referring to FIG. 2, a beacon device 100B, for example, a BLE-based beacon device 100B, may include a switch 110, an NFC tag 115, a control circuit 120B, a memory device 140, a wireless transmitter 150, and a battery 160. Although the beacon device 100B including both the switch 110 and the NFC tag 115 is shown by way of example in FIG. 2, but the beacon device 100B may include the switch 110 or the NFC tag 115 according to exemplary embodiments.

The control circuit 120B may generate a count value CNT by counting an operation time corresponding to a wakeup state based on a first wakeup signal WKU1 or a second wakeup signal WKU2, maintain a state of the beacon device 100B as the wakeup state until the count value CNT reaches a reference count value RCNT, and change the state of the beacon device 100B from the wakeup state to the idle state when the count value CNT is greater than the reference count value RCNT.

The control circuit 120B includes a clock signal generator 125, a switch 127, a counter 126, a comparator 128, and a controller 122. The clock signal generator 125, the switch 127, the counter 126, and the comparator 128 may be replaced with a timer. The function of the timer may be the same as the function of the timer described with reference to FIG. 1.

The clock signal generator 125 generates a clock signal CLK and supplies a generated clock signal CLK to the switch 127. The switch 127 may control transmission of a clock signal CLK output from the clock signal generator 125 to the counter 126 based on a first wakeup signal WKU1 or a second wakeup signal WKU2.

The counter 126 generates a count value CNT in response to (or based on) a clock signal CLK. The comparator 128 compares the count value CNT with a reference count value RCNT, and generates a comparison signal COMP.

The state of the controller 122 is changed from an idle state to a wakeup state based on a first wakeup signal WKU1 or a second wakeup signal WKU2.

The controller 122 may maintain the state of the beacon device 100B as the wakeup state based on a comparison signal COMP having a first level (for example, a low level) which is generated when the count value CNT is equal to or less than the reference count value RCNT. However, the controller 122 may change the state of the beacon device 100B from the wakeup state to the idle state based on a comparison signal COMP having a second level (for example, a high level) which is generated when the count value CNT is greater than the reference count value RCNT.

The control circuit 120B may generate a control signal CTRL for controlling at least one of the wireless transmitter 150 and the battery 160 such that the output voltage PW of the battery 160 is supplied to the wireless transmitter 150 only while the state of the beacon device 100B maintains a wakeup state.

Figure 3:
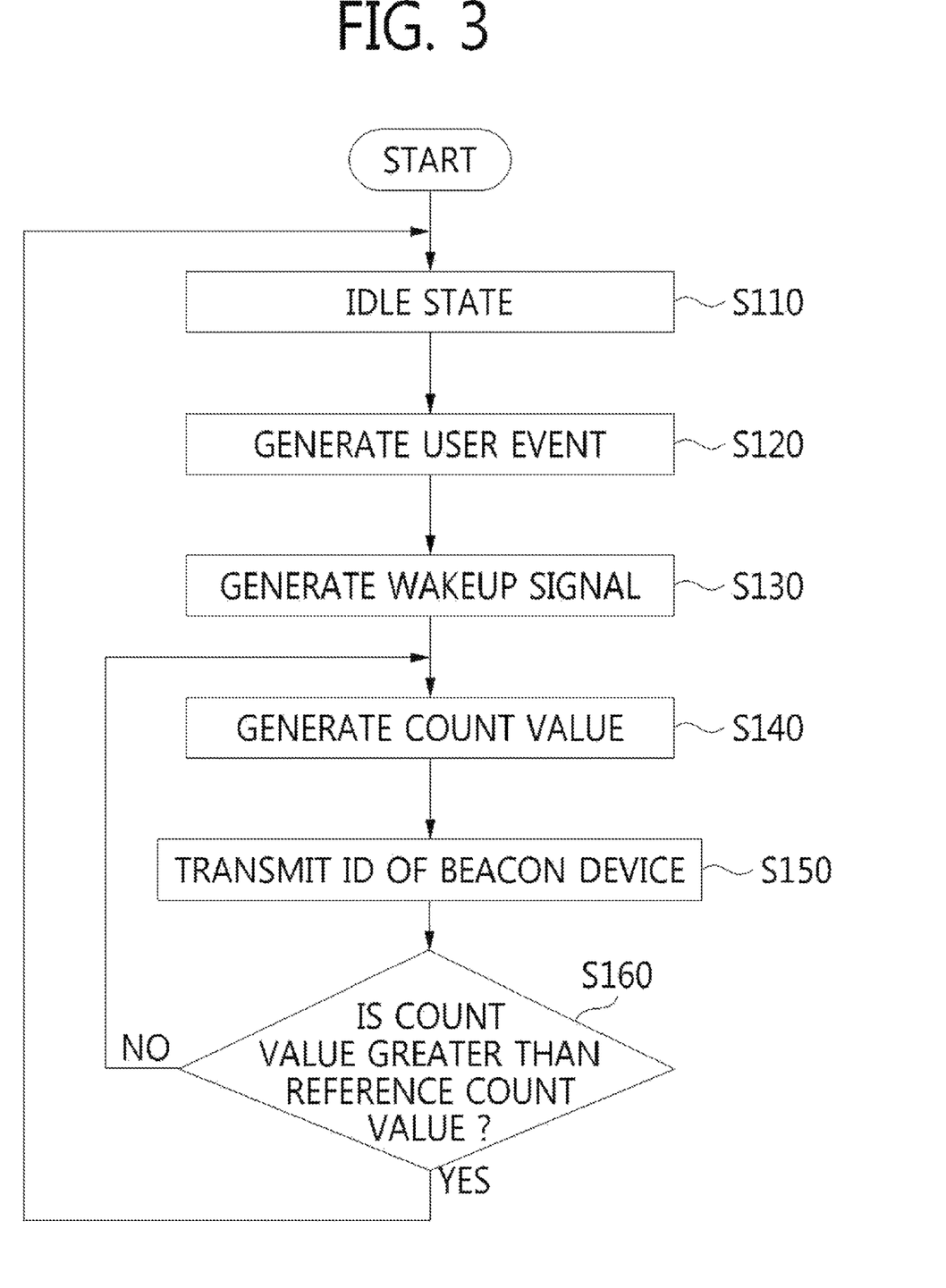
FIG. 3 is a flowchart which describes an operation of the beacon device shown in FIG. 1 or 2.

FIG. 3 is a flowchart which describes an operation of the beacon device shown in FIG. 1 or 2. The operation of the beacon device 100A or 100B will be described with reference to FIGS. 1 to 3.

It is assumed that an operation state of the beacon device 100A or 100B is an idle state so as to reduce power consumption and to transmit a beacon signal (for example, the BID) to a mobile device periodically or several times only when a user desires (S110).

When the beacon device 100A or 100B is in an idle state, a user event is generated by a user (S120). A user event may be an action of pressing or touching the switch 110 with a part of a user's body (for example, a finger or foot) or an action of scanning (or non-contact touching) the NFC tag 115 with a mobile device including an NFC reader.

When a user event for the switch 110 or the NFC tag 115 is generated (S120), the switch 110 generates a first wakeup signal WKU1 and the NFC tag 115 generates a second wakeup signal WKU2 (S130).

The counter 126 of the control circuit 120A or 120B of the beacon device 100A or 100B in a wakeup state starts a count operation using a clock signal CLK as described with reference to FIG. 1 or 2 and generates a count value CNT (S140). The timer (for example, the hardware timer or the firmware (or software) timer) described with reference to FIG. 1 starts an operation of counting an operation time or a wakeup time based on a first wakeup signal WKU1 or a second wakeup signal WKU2.

The control circuit 120A or 120B reads the ID (BID) of the beacon device 100A or 100B stored in the memory device 140 and transmits the read ID (BID) to the wireless transmitter 150 periodically or aperiodically several times. As a result, the wireless transmitter 150 transmits the ID (BID) periodically or aperiodically (S150). The comparator 128 of the control circuit 120A or 120B compares a count value CNT with a reference count value RCNT (S160).

When a count value CNT is greater than a reference count value RCNT (YES in S160), the comparator 128 transmits a comparison signal COMP having a second level to the controller 122. The controller 122 changes the state of the beacon device 100A or 100B from a wakeup state to an idle state. The beacon device 100A or 100B operating in an idle state maintains the idle state until a new user event is generated. The beacon device 100A or 100B in an idle state cannot transmit the ID (BID) of the beacon device 100A or 100B, and thus power consumption of the beacon device 100A or 100B is reduced as compared to a conventional beacon device which periodically transmits the ID all the time.

When a count value CNT is not greater than a reference count value RCNT (NO in S160), the comparator 128 transmits a comparison signal COMP having a first level to the controller 122. At this time, the controller 122 maintains the state of the beacon device 100A or 100B as a wakeup state as it is, and thereby the beacon device 100A or 100B transmits the ID (BID) through the wireless transmitter 150 periodically or aperiodically several times (S150). For example, the reference count value RCNT may be a count value corresponding to several seconds, and a user of the beacon device 100A or 100B may program the reference count value RCNT in the memory device 140 using the controller 122.

Figure 4:
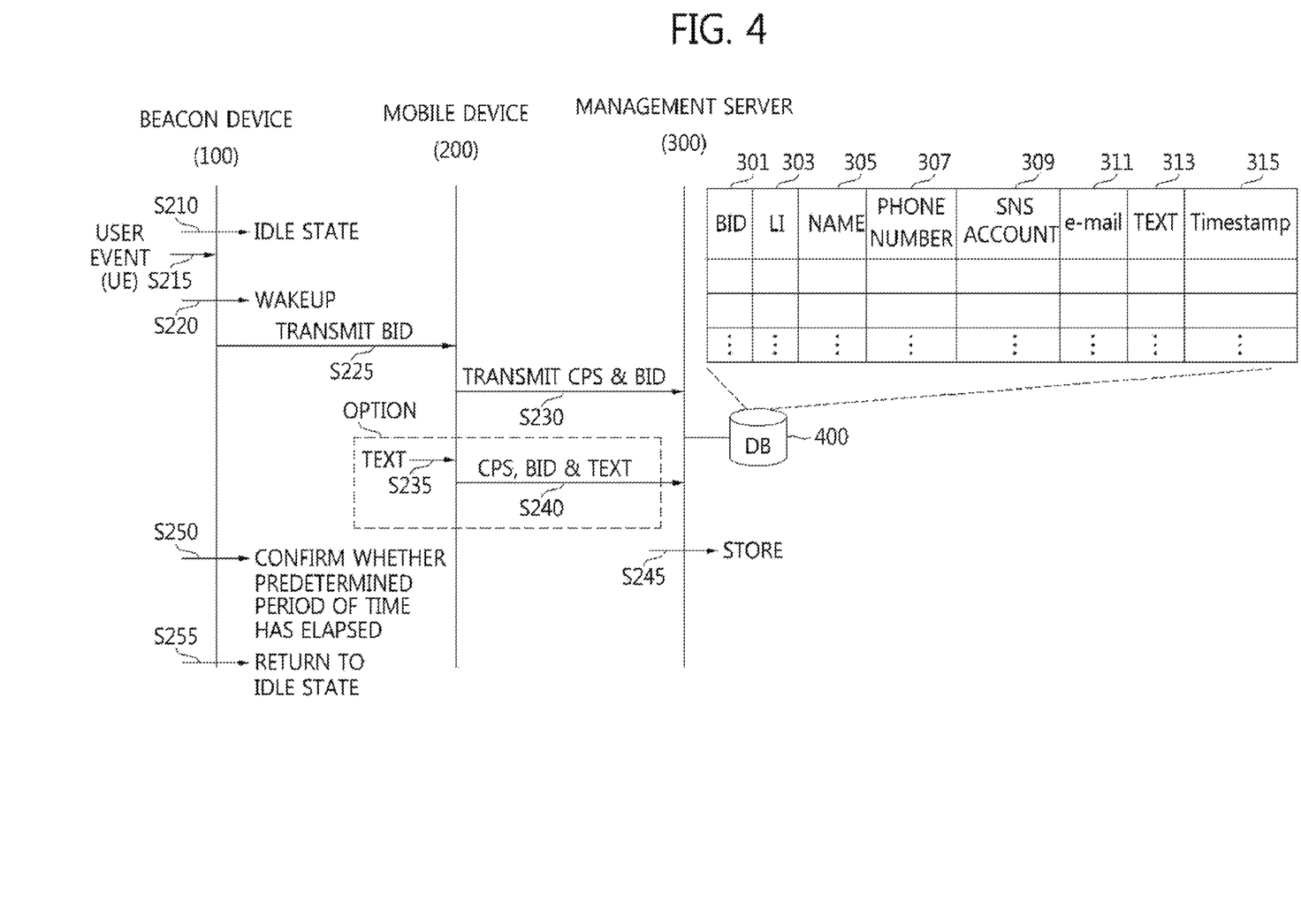
FIG. 4 is a data flowchart for describing a method of providing a service according to the exemplary embodiments of the present invention using the beacon device shown in FIG. 1 or 2.

FIG. 4 is a data flowchart for describing a method of providing a service according to exemplary embodiments of the present invention using the beacon device shown in FIG. 1 or 2. A process by which a user creates a digital guest book will be described in detail with reference to FIGS. 1 to 4. Since the digital guest book does not have a name, a phone number, an address, and an e-mail address of a user directly described in a guest book of a paper form, it is possible to prevent leakage of a user's personal information.

If a user event UE for the beacon device 100 is generated (S215) when the state of the beacon device 100 is an idle state (S210), that is, if a wakeup signal WKU1 or WKU2 is generated (S215), the beacon device 100 is waken-up (S220). The waken-up beacon device 100 may transmit the ID (BID) to the mobile device 200 periodically or aperiodically several times (S225). It is assumed that an application (app or application program) for a beacon service is installed in the mobile device 200, and a Bluetooth transceiver of the mobile device 200 is turned on.

Transmission of a signal by an application in the present specification may mean that a wireless transceiver installed (or disposed) in the mobile device 200 transmits or receives a signal to or from an external wireless communication device under control of the control circuit 120A or 120B executing the application.

If (or Once) the application installed in the mobile device 200 receives the ID (BID) of the beacon device 100, the application may automatically transmit a plurality of contact points CPS of a user of the mobile device 200 and an ID (BID) of the beacon device 100 to the management server 300 through a wireless communication network (S230).

The contact points CPS may include at least two of a name of the user, an SNS account of the user, a user identification number (for example, a phone number) of the mobile device 200, and an email-address of the user, and may be stored in a memory device in advance. The memory device 140 collectively refers to a volatile memory device and a non-volatile memory device. The contact points CPS may refer to a plurality of contact points which a user desires to provide to the management server 300.

According to exemplary embodiments, the user may store the contact points CPS in a memory device of the mobile device 200 using the application.

According to exemplary embodiments, if (or once) the ID (BID) of the beacon device 100 is transmitted to the mobile device 200, the application may provide (for example, provide in a pop-up form) a list of contact points CPS to a user through a display device of the mobile device 200. If the user selects at least two of the list of contact points CPS displayed on the display device, the application may transmit selected contact points and the ID (BID) to the management server 300 through a wireless communication network (S230).

According to exemplary embodiments, a user may create writing to be written, for example, a text TEXT, in a digital guest book using the application (S235). The application may transmit the contact points CPS of the user, the ID (BID) of the beacon device 100, and the text TEXT to the management server 300 through a wireless communication network (S240).

The management server 300 may store the contact points CPS of the user and the ID (BID) of the beacon device 100 in a database 400 (S245). According to another exemplary embodiment, the management server 300 may store the contact points CPS of the user, the ID (BID) of the beacon device 100, and the text TEXT in the database 400 (S245).

A table of the digital guest book stored in the database 400 may include a plurality of fields 301, 303, 305, 307, 309, 311, 313, and 315. A first field 301 may store the ID (BID) of the beacon device 100, a second field 303 may store location information LI for a location at which the beacon device 100 is installed, a third field 305 may store a name of a user, a fourth field 307 may store a phone number of the user, a fifth field 309 may store an SNS account of the user, a sixth field 311 may store an email-address, a seventh field 313 may store a text TEXT, and an eighth field 315 may store a time stamp for time at which contact points CPS are received. The table of the digital guest book shown in FIG. 4 is merely an exemplification for convenience of description.

The control circuit 120A or 120B of the beacon device 100 may determine whether a predetermined period of time since an occurrence of a user event UE (for example, five seconds after the switch 110 is pressed) has elapsed (S250). As described above, whether the predetermined period of time has elapsed may be determined or decided by the counter 126, the comparator 128, and the controller 122 (S250).

If a predetermined period of time has not elapsed, the beacon device 100 maintains a wakeup state, for example, broadcasts or transmits the ID (BID), and, if the predetermined period of time has elapsed, the beacon device 100 is changed from a wakeup state to an idle state so as to reduce power consumption (S255). That is, the beacon device 100 does not broadcast the ID (BID) any more.

Figure 5:
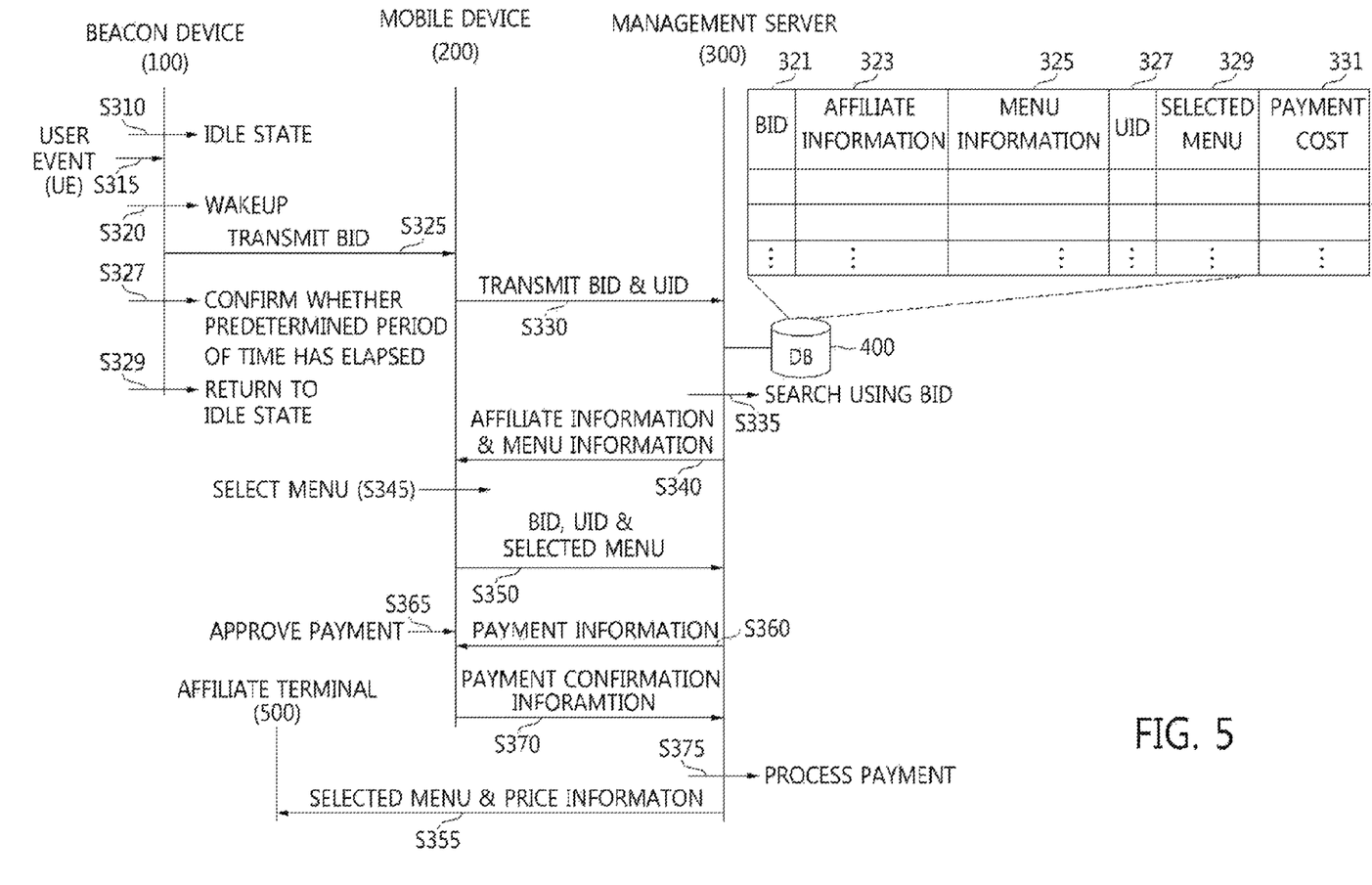
FIG. 5 is a data flowchart for describing the method of providing a service according to the exemplary embodiments of the present invention using the beacon device shown in FIG. 1 or 2.

FIG. 5 is a data flowchart for describing the method of providing a service according to the exemplary embodiments of the present invention using the beacon device shown in FIG. 1 or 2. A method of providing, by a user of the mobile device 200, a service using the beacon device 100 at a commercial place (for example, a restaurant, a café, a theater, or a place at which a service can be provided with a payment) will be described in detail with reference to FIGS. 1 to 3, and 5.

When the state of the beacon device 100 is an idle state (S310), if a user event UE for the beacon device 100 is generated (S315), that is, if a wakeup signal WKU1 or WKU2 is generated, the beacon device 100 is waken-up (S320). The waken-up beacon device 100 may transmit the ID (BID) of the beacon device 100 to the mobile device 200 periodically or aperiodically several times (S325). As described above, it is assumed that an application (app or application program) for a beacon service is installed in the mobile device 200, and a Bluetooth transceiver is turned on. The mobile device 200 is a mobile device that is not paired with the beacon device 100.

The control circuit 120A or 120B of the beacon device 100 may confirm whether a predetermined period of time has elapsed (S327). As described above, whether a predetermined period of time has elapsed may be determined or decided by the counter 126, the comparator 128, and the controller 122 (S327). That is, the control circuit 120A or 120B may determine or decide whether a predetermined period of time has elapsed (S327).

If a predetermined period of time has not elapsed, the beacon device 100 maintains a wakeup state, and, if the predetermined period of time has elapsed, the beacon device 100 is changed from a wakeup state to an idle state so as to reduce power consumption (S329).

If (or Once) the application installed in the mobile device 200 receives the ID (BID) of the beacon device 100, the application may transmit the ID (BID) of the beacon device 100 and a unique identification number UID of the mobile device 200 to the management server 300 through a wireless communication network (S330). When the mobile device 200 is a smart phone, the unique identification number UID may be a phone number of the smart phone.

The management server 300 may search for affiliate information and menu information from the database 400 using the ID (BID) of the beacon device 100 (S335) and transmit the affiliate information and the menu information to the mobile device 200 corresponding to the unique number UID (S340).

The database 400 may include a plurality of fields 321, 323, 325, 327, 329, and 331. A first field 321 stores the ID (BID) of the beacon device 100, a second field 323 stores affiliate information (for example, a name, an address, a business registration number, and the like) of an affiliated store in which the beacon device 100 is installed, a third field 325 stores respective names and prices of menus (for example, items or services) provided at the affiliated store, a fourth field 327 stores the unique number (UID) of the mobile device 200, a fifth field 329 stores selected menu(s) selected by a user of the mobile device 200, and a sixth field 331 stores a total cost of the selected menu(s) (for example, a payment cost for payment).

If an application executed in the mobile device 200 displays the affiliate information and the menu information on a display device, the user may select at least one menu among menus included in the menu information (S345). The application may transmit the ID (BID) of the beacon device 100, the unique identification number (UID) of the mobile device 200, and the selected menu to the management server 300 through a wireless communication network (S350). According to an exemplary embodiment, the application may transmit only a selected menu to the management server 300 through a wireless communication network (S350).

The management server 300 may transmit a selected menu and price information of the selected menu to an affiliate terminal 500 which matches the ID (BID) of the beacon device 100 and is installed in an affiliated store in which the beacon device 100 is installed through a wired communication network or a wireless communication network (S355).

The management server 300 may transmit payment information for a payment of a menu selected by a user to the mobile device 200 (S360). The payment information may include affiliate information and cost information of a selected menu.

An application executed in the mobile device 200 displays the payment information on a display device, a user may confirm the payment information and input a payment approval to the application (S365). The application may generate payment confirmation information in response to the payment approval and transmit the payment confirmation information to the management server 300 through a wireless communication network (S370). For example, the payment confirmation information may include payment method information (for example, a credit card number, a check card number, a gift card number, an app card number, or a phone number for a mobile payment, and the like), information on a payment amount, and affiliate information. The management server 300 may receive the payment confirmation information and perform payment processing (S375).

The beacon device 100 described with reference to FIG. 5 may be attached to a table, and thus the ID (BID) of the beacon device 100 may refer to a unique identification number which can uniquely identify the table. A user of the mobile device 200 may generate a user event, give an order using an application executed in the mobile device 200, and make a payment using the application without generating an additional user event using the switch 110 or the NFC tag 115 of the beacon device 100.

Figure 6:
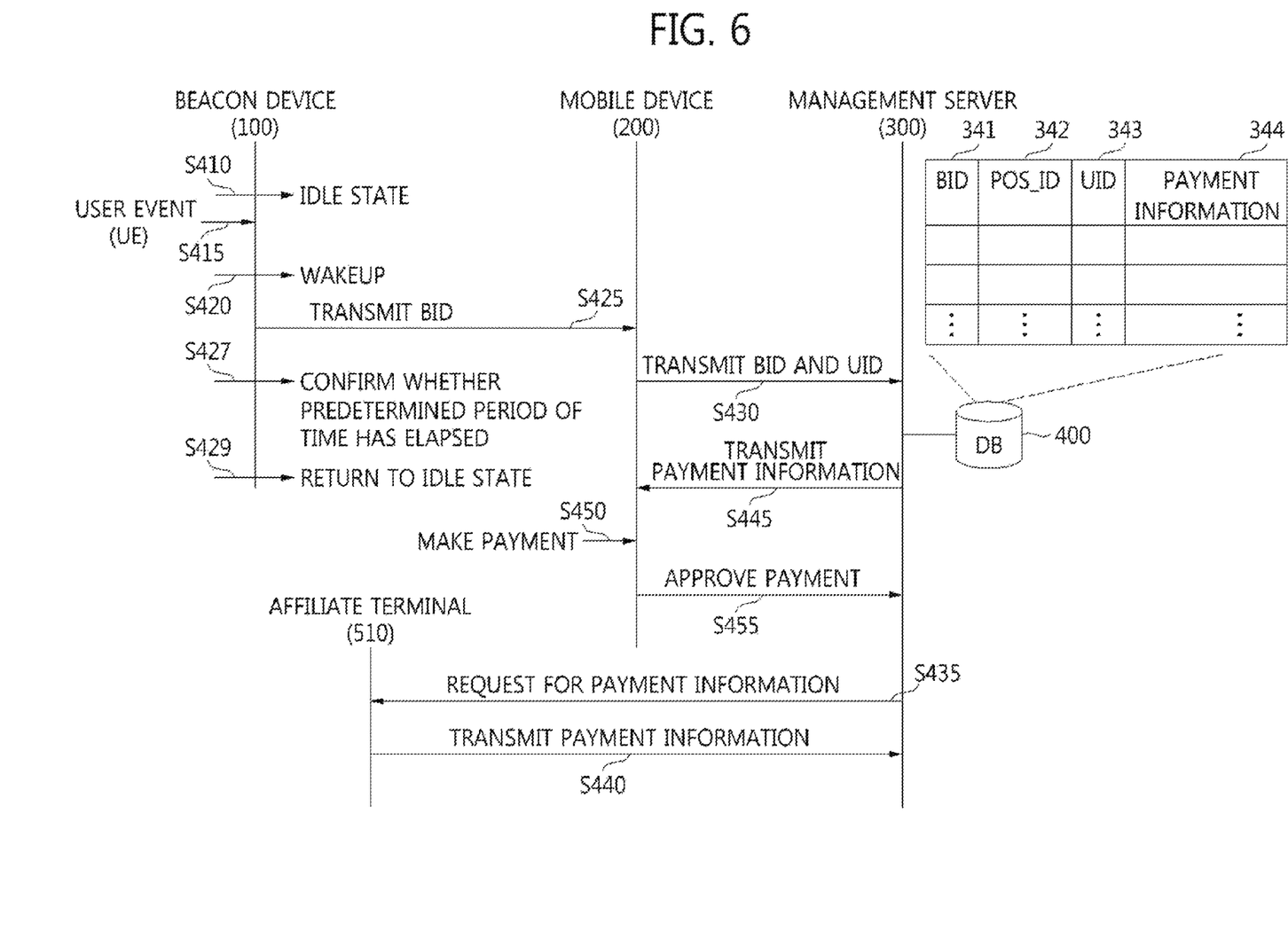
FIG. 6 is a data flowchart for describing the method of providing a service according to the exemplary embodiments of the present invention using the beacon device shown in FIG. 1 or 2.

FIG. 6 is a data flowchart for describing the method of providing a service according to the exemplary embodiments of the present invention using the beacon device shown in FIG. 1 or 2. A method of providing a service in a case in which a user of the mobile device 200 uses the switch 110 or the NFC tag 115 of the beacon device 100 only to make a payment instead of giving an order will be described with reference to FIGS. 1 to 3, and 6.

When the state of the beacon device 100 is an idle state (S410), if a user event UE for the beacon device 100 is generated (S415), that is, if a wakeup signal WKU1 or WKU2 is generated, the beacon device 100 is waken-up (S420). The waken-up beacon device 100 may transmit the ID (BID) to the mobile device 200 periodically or several times (S425). As described above, it is assumed that an application (app or application program) for a beacon service is installed in the mobile device 200, and a Bluetooth transceiver is turned on. The mobile device 200 is a mobile device that is not paired with the beacon device 100.

The control circuit 120A or 120B of the beacon device 100 may confirm whether a predetermined period of time has elapsed (S427). As described above, whether a predetermined period of time has elapsed may be determined or decided by the counter 126, the comparator 128, and the controller 122 (S427). According to an exemplary embodiment, the control circuit 120A or 120B may determine or decide whether a predetermined period of time has elapsed using firmware or software (S427).

If a predetermined period of time has not elapsed, the beacon device 100 maintains a wakeup state, and, if the predetermined period of time has elapsed, the beacon device 100 is changed from a wakeup state to an idle state so as to reduce power consumption (S429).

If (or Once) an application being executed in the mobile device 200 receives the ID (BID) of the beacon device 100, the mobile device 200 may transmit the ID (BID) of a beacon device 100 and a unique identification number UID of the mobile device 200 to the management server 300 through a wireless communication network (S430).

The management server 300 may search for an ID (POS_ID) of an affiliate terminal 510 from the database 400 using the ID (BID) of the beacon device 100 and request an affiliate terminal 510 corresponding to the searched ID (POS_ID) 342, for example, a point-of-sale (POS) terminal for payment information (S435). The affiliate terminal 510 may transmit payment information to the management server 300 (S440).

The management server 300 or the database 400 may include a plurality of fields 341, 342, 343, and 344. The table which may be accessed by the management server 300 may be stored in a data storage device (for example, a memory device).

A first field 341 stores the ID (BID) of the beacon device 100, and a second field 342 stores an ID (POS_ID) of the affiliate terminal 510 installed in an affiliated store in which the beacon device 100 is installed. A third field 343 stores a unique identification number UID of a mobile terminal 200 requesting for a payment, and a fourth field 344 stores payment information transmitted from the affiliate terminal 510.

The management server 300 may transmit payment information transmitted from the affiliate terminal 510 to a mobile terminal 200 corresponding to the unique identification number UID (S445). The payment information transmitted to the mobile terminal 200 may include the name, address, business registration number, and/or payment amount of an affiliated store.

If an application being executed in the mobile device 200 displays the payment information on a display device, a user may confirm the payment information and input a payment in the application (S450). The application may generate payment approval information in response to the payment and transmit the payment approval information to the management server 300 through wireless communication network (S455). For example, the payment approval information may include payment method information (for example, a credit card number, a check card number, a gift card number, an app. card number, or a phone number for a mobile payment, and the like), information on a payment amount, and affiliate information. The management server 300 may receive payment approval information and perform payment processing.

The method of providing a service described with reference to FIG. 6 is a method in which information of a commercial business operator (that is, an affiliated store) is transmitted to a user (that is, a user of the mobile terminal 200) instead of a method in which information of a person to pay (that is, a user of the mobile terminal 200) is transmitted to a commercial business operator (that is, an affiliated store).

Figure 7:
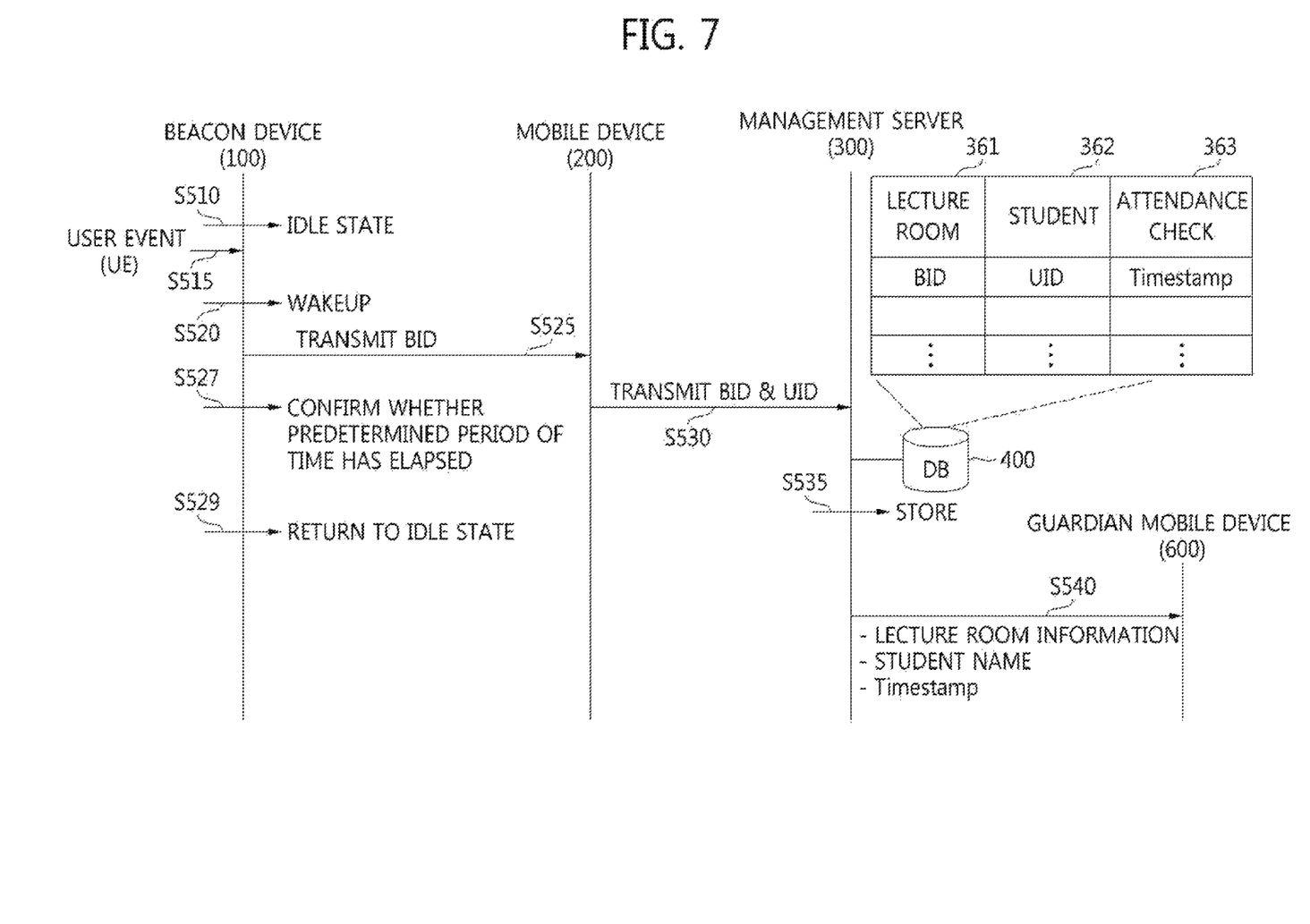
FIG. 7 is a data flowchart for describing the method of providing a service according to the exemplary embodiments of the present invention using the beacon device shown in FIG. 1 or 2.

FIG. 7 is a data flowchart for describing the method of providing a service according to the exemplary embodiments of the present invention using the beacon device shown in FIG. 1 or 2. A method of checking attendance according to an exemplary embodiment of the present invention will be described in detail with reference to FIGS. 1 to 3, and 7.

When the state of the beacon device 100 is an idle state (S510), if a user event UE for the beacon device 100 is generated (S515), that is, if a wakeup signal WKU1 or WKU2 is generated, the beacon device 100 is waken-up (S520). The waken-up beacon device 100 may transmit the ID (BID) to the mobile device 200 periodically or several times (S525). As described above, it is assumed that an application (app. or application program) for a beacon service is installed in the mobile device 200, and a Bluetooth transceiver is turned on. The mobile device 200 is a mobile device that is not paired with the beacon device 100.

The control circuit 120A or 120B of the beacon device 100 may confirm whether a predetermined period of time since the occurrence of a user event UE has elapsed (S527). As described above, whether a predetermined period of time has elapsed may be determined or decided by the counter 126, the comparator 128, and the controller 122 (S527). The control circuit 120A or 120B may determine or decide whether a predetermined period of time has elapsed using firmware or software executed therein (S527).

If a predetermined period of time has not elapsed, the beacon device 100 maintains a wakeup state, and, if the predetermined period of time has elapsed, the beacon device 100 is changed from a wakeup state to an idle state so as to reduce power consumption (S529).

If (or Once) an application being executed in the mobile device 200 receives an ID (BID) of the beacon device 100, the mobile device 200 may transmit the ID (BID) of the beacon device 100 and a unique identification number UID of the mobile device 200 to the management server 300 through a wireless communication network (S530).

If (or Once) an application being executed in the mobile device 200 receives an ID (BID) of the beacon device 100, the mobile device 200 may transmit the ID (BID) of the beacon device 100 and a unique identification number UID of the mobile device 200 to the management server 300 through a wireless communication network (S530).

The management server 300 may store the ID (BID) of the beacon device 100 and a unique identification number UID of the mobile device 200 in the database 400 (S535). The database 400 may store a table (or a look-up table) including a plurality of fields 361, 362, and 363. A first field 361 may store an ID (BID) of the beacon device 100 installed in a lecture room, a second field 362 may store a unique identification number UID of a mobile device 200 corresponding to a student, and a third field 363 may store a time stamp for checking attendance.

The management server 300 may transmit information on a lecture room corresponding to the ID (BID) of the beacon device 100, a student name corresponding to the unique identification number UID of the mobile device 200, and a time stamp for checking attendance to a guardian mobile device 600 (S540).

The present inventions are described with reference to exemplary embodiments described in drawings but are merely exemplifications. It will be understood by those skilled in the art that various modifications and equivalent exemplary embodiments may be made. Accordingly, the true technical protection scope of the present inventive concepts should be determined by technical concepts of appended claims.

INDUSTRIAL APPLICABILITY

The present inventions are applicable to a BLE-based beacon device and a method for providing a beacon service using the BLE-based beacon device.

What is claimed is:

1. A Bluetooth low energy (BLE)-based beacon device comprising:
   a wireless transmitter;
   a memory device that stores an ID of the BLE-based beacon device;
   a push button switch; and
   a control circuit directly connected to the push button switch and configured to change a state of the BLE-based beacon device from an idle state to a wakeup state based on a wakeup signal generated in response to the push button switch being pressed, and transmits the ID stored in the memory device to the wireless transmitter only while the state of the BLE-based beacon device is the wakeup state,
   wherein the control circuit includes:
   a clock signal generator that generates a clock signal;
   a counter;
   a switch that is connected between the clock signal generator and the counter, and transmits the clock signal outputted from the clock signal generator to the counter based on the wakeup signal generated in response to the push button switch being pressed; and
   a comparator that compares a count value with a reference count value and generates a comparison signal, and
   wherein the counter generates the count value in response to the clock signal.

2. The BLE-based beacon device of claim 1,
   wherein the control circuit generates the count value by counting an operation time based on the wakeup signal, maintains the state of the BLE-based beacon device as the wakeup state until the count value reaches the reference count value, and changes the state of the BLE-based beacon device from the wakeup state to the idle state when the count value is greater than the reference count value.

3. The BLE-based beacon device of claim 2, further comprising:
   a battery,
   wherein the control circuit controls at least one of the wireless transmitter and the battery such that an output voltage of the battery is supplied to the wireless transmitter only while the BLE-based beacon device is in the wakeup state.

4. The BLE-based beacon device of claim 1,
   wherein the control circuit further includes:
   a controller that maintains the state of the BLE-based beacon device as the wakeup state or changes the state of the BLE-based beacon device from the wakeup state to the idle state based on the comparison signal of the comparator.

5. A Bluetooth low energy (BLE)-based beacon device comprising:
   a wireless transmitter;
   a memory device that stores an ID of the BLE-based beacon device;
   a push button switch; and
   a control circuit directly connected to the push button switch and configured to sense the push button switch being pressed, changes a state of the BLE-based beacon device from an idle state to a wakeup state, determine whether a predetermined period of time has elapsed, and changes the state of the BLE-based beacon device from the wakeup state to the idle state when the predetermined period of time has elapsed,
   wherein the control circuit transmits the ID stored in the memory device to the wireless transmitter only while the BLE-based beacon device is in the wakeup state,
   wherein the control circuit includes:
   a clock signal generator that generates a clock signal;
   a counter;
   a switch that is connected between the clock signal generator and the counter, and transmit the clock signal outputted from the clock signal generator to the counter based on a wakeup signal generated in response to the push button switch being pressed; and
   a comparator that compares a count value with a reference count value and generates a comparison signal, and
   wherein the counter generates the count value in response to the clock signal.

6. The BLE-based beacon device of claim 5,
   wherein the control circuit generates the count value by counting the predetermined period of time based on a result of the sensing of the push button switch being pressed, maintains the state of the BLE-based beacon device as the wakeup state until the count value reaches the reference count value, and changes the state of the BLE-based beacon device from the wakeup state to the idle state when the count value is greater than the reference count value.

* * * * *